Figure 5:
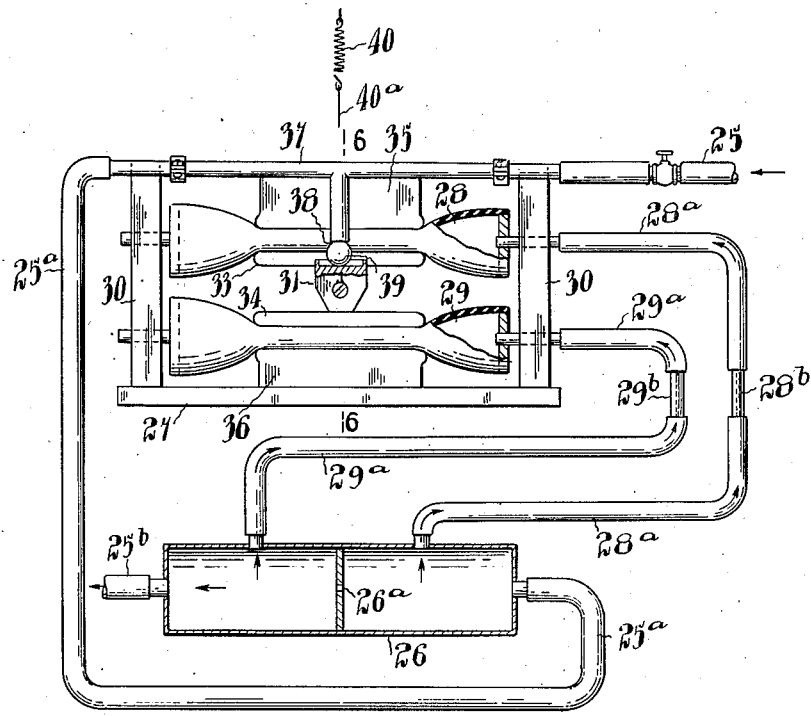

Aug. 1, 1939.   H. E. T. HAULTAIN   2,168,207
APPARATUS FOR CLASSIFYING FINELY GRANULATED SOLIDS ACCORDING TO SIZE
Filed May 21, 1936   2 Sheets-Sheet 1
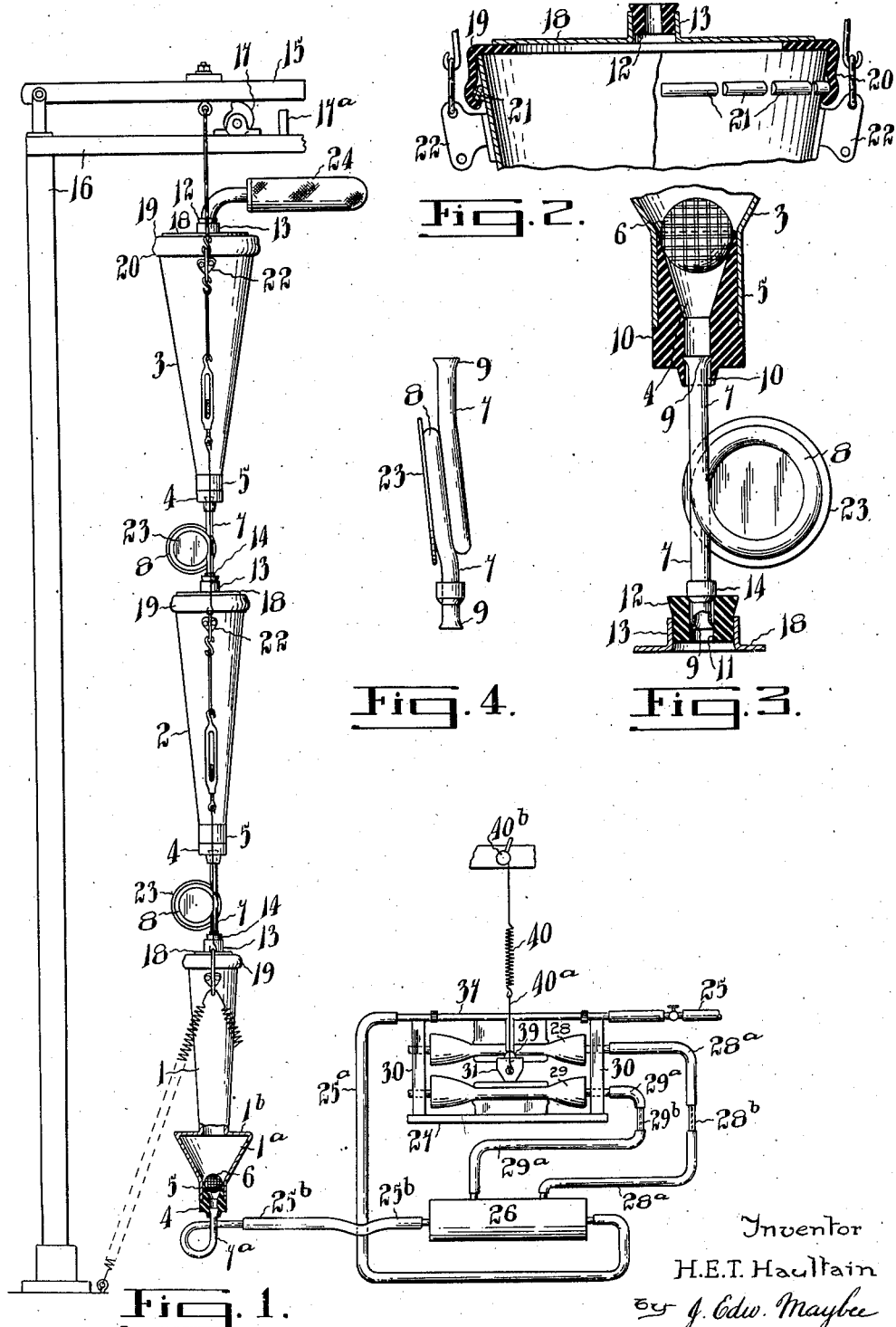
Inventor
H.E.T. Haultain
by J. Edw. Maybee
ATTY Aug. 1, 1939.  H. E. T. HAULTAIN  2,168,207
APPARATUS FOR CLASSIFYING FINELY GRANULATED SOLIDS ACCORDING TO SIZE
Filed May 21, 1936  2 Sheets-Sheet 2

Inventor
H.E.T. Haultain
by J. Edw. Maybee
ATTY.

Patented Aug. 1, 1939

2,168,207

UNITED STATES PATENT OFFICE 2,168,207

APPARATUS FOR CLASSIFYING FINELY GRANULATED SOLIDS ACCORDING TO SIZE

Herbert E. T. Haultain, Toronto, Ontario, Canada

Application May 21, 1936, Serial No. 80,947

5 Claims. (Cl. 209—139)

This invention relates to apparatus for classifying finely granulated solids according to size by means of upright settling tubes of progressively greater diameter connected in series, and through which tubes a fluid carrying the solids in suspension is passed. Such apparatus is disclosed in my United States Patent No. 2,034,185 dated March 17, 1936 and the objects of this invention are to provide apparatus in which the tendency of the fine particles to adhere to the sides of the tubes will be minimized, in which the particles from any tube at the end of a test cannot drop into the tube below, in which the volume of fluid passing through the tubes is maintained constant, in which means is provided to prevent the fluid from carrying particles from a tube in which they should remain, and in which the tubes are so constructed that any vibration imparted thereto will continue for a maximum period.

I attain my objects by providing tubes which are conical throughout their length and are connected together by means of conduits each having a loop formed intermediate its ends to trap any material getting past a valve member in the lower end of the tube above the conduit. The valve members are adapted to be vibrated by the flow of fluid through the tubes. The movements of these valve members assist in the separation of the particles and the valve members substantially close the inlet openings of the tubes on the cessation of flow. Means for automatically controlling the volume of fluid passing through the tubes is provided to compensate for any variation in the back pressure in the tubes whereby the volume of fluid through the tubes is maintained substantially constant. One or more of the small sized tubes are provided with means to prevent jets of fluid from carrying particles out of such tubes which should remain therein. The top of each tube comprises a rubber annulus fitted on the metallic conical wall thereof in such manner that it will have no dampening effect on the tube when it is vibrated.

Figure 6:
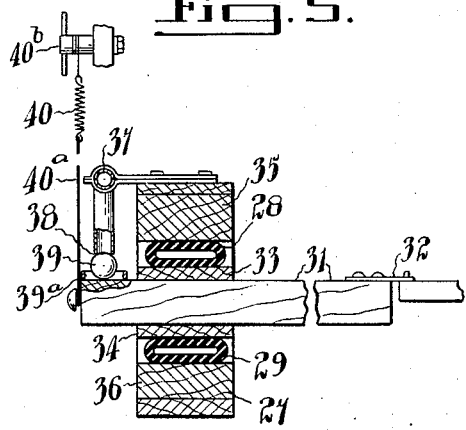

The constructions are hereinafter more fully described and are illustrated in the accompanying drawings in which Fig. 1 is a side elevation of the apparatus;

Fig. 2 a sectional detail, on an enlarged scale, of the upper end of a tube showing the rubber annulus for carrying the stopper collar;

Fig. 3 a detail in side elevation of the trap connection between adjacent tubes;

Fig. 4 an end elevation of the trap shown in Fig. 3;

Fig. 5 a side elevation, partly in section, of the means for controlling the volume of air; and Fig. 6 a cross section on the line 6—6 in Fig. 5.

In the drawings like numerals of reference indicate corresponding parts in the different figures.

1 is a tube which may serve as a receptacle for receiving the finely divided, granulated or pulverized material to be analysed or classified according to size. The tube 1 is connected in series with one or more tubes 2, 3 and all the tubes may be supported in any suitable manner so that they may be vibrated by any suitable means.

The tube 2 is larger in diameter than the tube 1 and the tube 3 is larger in diameter than the tube 2, so that the velocity of the fluid passing through the tubes is progressively decreased whereby different sized particles will be deposited in the different sized tubes. The tubes are conical and formed of sheet metal, each tube being provided with a conical inlet 4 preferably formed of molded rubber adapted to be frictionally supported in a collar 5 at the lower end of each tube. On the conical wall of each inlet is seated a valve member 6 which is preferably a golf ball having an indented surface. Communication between adjacent tubes is established by a conduit 7 which is looped at 8 intermediate its ends. The ends of each conduit 7 are provided with bell mouths 9, the upper bell mouth is adapted to be received in the bore 10 of an inlet 4 so that the conduit is free to rock relative to the inlet. The lower bell mouth of each conduit 7 is adapted to be received in the bore 11 of a rubber stopper 12 carried by a collar 13 on the upper or outlet end of the adjacent tube. The conduits are thus free to rock in the stoppers 12 as well as in the inlets. Preferably each conduit is provided with a shoulder 14 adjacent its lower end for engagement with the upper end of a stopper to prevent the accidental withdrawal of the upper bell mouth 9 from its bore 10.

The tubes 1, 2 and 3 are suspended from a carrier 15 which is so supported on a stationary frame 16 that a snail cam 17 will engage it to vibrate the tubes when the carrier drops from the high portion of the cam and contacts with a stop 17ᵃ on the frame 16. This vibration results in any particles adhering to the sides of the tube being loosened therefrom so that they will slide down the said sides. The collars 13 are carried by disks 18 and each disk is secured to the top end of a tube by means of a rubber annulus 19 having a depending flange 20 adapted to frictionally engage projections 21 carried by the outer side of the tube. The projections 21 are arranged around each tube in spaced relationship to one another instead of being a solid ring which would tend to dampen any vibration of the tube. For the same reason, the top of each tube is provided with the rubber annulus rather than having a metal top which would have to be secured to the tube to form an air tight joint and would thus dampen the vibrations of the tube. The means for suspending the tubes from the carrier 15 includes lugs 22 secured to the walls of the tubes, each tube having two diametrically opposite lugs secured thereto instead of forming the lugs on bands passing round the tubes, which bands also would tend to dampen the vibrations of the tubes.

As hereinbefore mentioned, the tubes are conical throughout their length, which shape, I have found, results in fewer fine particles adhering to the sides of the tubes. Should any material get past a ball 6 it will be trapped in the loop 8 of the conduit 7 beneath the ball and, therefore, it is prevented from falling into the tube beneath the tube from which it came. When the operator removes each conduit 7 to remove the contents of the tube thereabove, he also removes the contents of the conduit and places both products into the same receptacle. To facilitate the removal of any material from the trap or loop 8, each loop has a disk 23 secured thereto so that the disk may be struck to vibate the conduit and thus loosen any particles which tend to adhere to the wall thereof. The disks are provided merely to prevent the conduits from being damaged. While a test is being conducted, the disks 23 may be struck occasionally with any suitable tool to insure the release of any particles adhering to the walls of the conduits 7.

The fluid is passed through the conduit 7a connected with the smallest tube 1 in which the material to be analyzed is placed. A porous thimble 24 is connected with the bore of the stopper 12 in the largest of the tubes and is adapted to filter the solid particles or fractions from the air which escapes through the pores of the thimble. To maintain the volume of fluid flowing through the tubes constant at all times, I provide the following means. In the flexible tubing 25, 25a and 25b connecting the conduit 7a with a suitable type of fluid supply means such as a source (not shown) of compressed air, is connected an orifice meter 26 and an air control device 27. The orifice meter in its simplest form comprises a passage having a partition provided with a small orifice 26a. The pressure in the passage at one side of the orifice is greater than that at the other side thereof.

One end of the meter passage 26 is connected by a piece of flexible tubing 28a and suitable fittings with one end of a collapsible tube 28, the other end of which is closed. The other end of the meter or pipe 26 is connected by a piece of flexible tubing 29a and suitable fittings with one end of a collapsible tube 29 having its other end closed. The collapsible tubes 28 and 29 are carried one above the other on a frame 30 so that the tubes are free to expand and contract. An arm 31 pivoted at 32 is passed between the tubes 28 and 29 and engages strips of substantially rigid material 33 and 34 interposed between the opposite sides of the arm and the tubes. The sides of the tubes remote from the arm engage substantially rigid strips 35 and 36 which engage the upper and lower sides of the frame 30. Between the pieces of tubing 25 and 25a is connected a T pipe 37 having a relief opening 38 at the end of the stem thereof. This opening is controlled by a valve plug or ball 39 carried by the arm 31. The ball rests on the upper surface of the arm which is provided with a ring 39a adapted to limit the movement of the ball relative to its seat formed by the opening 38 so that as the ball is raised by the arm it will center itself relative to the opening. The arm is urged by a spring 40 to tend to move the ball towards its seat. To vary the tension of the spring it may be connected intermediate the ends of a flexible cord 40a having one end secured to the arm and the other end wound on a spindle 40b which may be turned to increase or decrease the tension of the spring.

The volume of fluid passing through the orifice 26a and thus through the tubes 1, 2 and 3 is automatically controlled by the devices 26 and 27. Normally the pressure in the end of the passage 26 connected with the upper collapsible tube 28 is greater than that in the end of the passage connected with the lower tube 29 so that a predetermined leakage through the outlet opening 38 is effected under normal conditions. Any variation in the back pressure in the low pressure end of the passage 26 which will cause a variation in the differential pressure in the orifice meter will result in the ball 39 being moved closer to or further from the opening 38 to vary the volume of escaping air. Thus the greater the back pressure in the low pressure end of passage 26, the less the air will escape from the opening 38, thus increasing the pressure in the high pressure end of the passage 26, and thus maintaining a substantially constant difference of pressure at opposite sides of the orifice. Immediately the back pressure is reduced, the pressure at the high pressure end of the passage 26 is correspondingly reduced, to maintain the difference of pressures at opposite sides of the orifice substantially constant.

It is obvious that by varying the tension of the spring 40, the volume of fluid escaping through the outlet 38 may be varied to thus vary the difference of pressure at opposite sides of the orifice to any predetermined amount.

Preferably the pieces of flexible tubing 28a, 29a are provided with short lengths of glass tubes 28b, 29b having small bores which tend to dampen any sudden flow of air through the pieces of tubing and thus smoothly effect the movements of the arm 31 by the expansion and contraction of the tubes 28, 29.

In practice, I have discovered there is a tendency especially in tubes of small diameters, for the air to rush sometimes in jets past the major portion of the particles and carry out particles which would not otherwise be carried out of their tubes. To overcome this I provide small sized tubes, such as 1, with an enlarged chamber 1a having a top 1b concentric with the lower end of the tube 1. The tube inlet 4 and the ball 6 are located at the lower end of the chamber 1a so that the ball will deflect any air passing through the inlet against the top 1b. Thus the action of such jets is arrested.

What I claim as my invention is:

1. Apparatus of the class described comprising a plurality of settling tubes of progressively greater diameter arranged one above the other in substantial alinement and connected in series; means for passing finely divided solids suspended in a fluid upwardly through the tubes in succession, the tubes having valve seats; valve members adapted to engage the seats to prevent backflow of solids from the tubes and adapted to be raised off the seats by the passage of the fluid therethrough; and conduits connecting the upper ends of the tubes with the lower ends of adjacent tubes in the series, each conduit having substantially alined ends with a circular loop formed intermediate thereof for trapping any solids escaping past a valve member to ensure that such solids will not pass into a tube below that from which they came.

2. Apparatus of the class described comprising a plurality of settling tubes connected in series; means for passing finely divided solids suspended in a fluid through the series of tubes, the tubes being of progressively greater diameter from the tube adjacent the fluid entering end of the series towards the tube at the fluid outlet end; a conical chamber interposed between the lower end of the smallest tube and the said fluid entering end, the chamber having an annular top concentric with the said lower end and located close to the said fluid entering end; valve seats at the inlet ends of the chamber and the tubes other than the smallest tube, the inlet of the smallest tube being substantially in alinement with the inlet of the chamber and being flush with the top thereof; and valve members adapted to engage the seats for preventing backflow of solids therethrough and adapted to be raised off the seats by the passage of the fluid therethrough.

3. Apparatus of the class described comprising a plurality of settling tubes carried in spaced relationship to one another, each tube having an outlet and an inlet; tubing for connecting each outlet with the adjacent inlet of the next tube; means for passing finely divided solids suspended in a fluid through the tubes; means in each inlet for preventing backflow of solids therethrough; a removable top for each tube, each top having a rubber annulus adapted to be stretched over the upper end of a tube and form an air-tight flexible connection therewith; a rigid collar having an air-tight connection with the annulus; and a rubber stopper inserted in the collar, the aforesaid outlets being formed in the stoppers.

4. Apparatus of the class described comprising a plurality of settling tubes carried in spaced relationship to one another, each tube having an outlet and an inlet; tubing for connecting each outlet with the adjacent inlet of the next tube; means for passing finely divided solids suspended in a fluid through the tubes; means in each inlet for preventing backflow of solids therethrough; a plurality of spaced apart projections arranged around the outer side of each tube adjacent its upper end; a removable top for each tube, each top having a rubber annulus adapted to be stretched over the upper end of a tube and over the projections to form an air-tight flexible connection with the tube; a rigid collar having an air-tight connection with the annulus; and a rubber stopper inserted in the collar, the aforesaid outlets being formed in the stoppers.

5. Apparatus of the class described comprising a plurality of settling tubes of progressively greater diameter and connected in series; means for passing finely divided solids suspended in a fluid through the tubes, the tubes having inlets and outlets formed of resilient material in the opposite ends of the tubes; and a metal conduit inserted in an inlet and an outlet of adjacent tubes for connecting said tubes, the outside diameter of the conduit being slightly less than the bore of the inlet and outlet, the conduit having bell mouthed ends adapted to form an air-tight connection with said inlet and outlet and to permit an inlet or outlet to rock relative to the conduit so that adjacent tubes may rock relative to one another.

HERBERT E. T. HAULTAIN.